(No Model.)
J. NIXON
CORN HUSKER.
No. 259,197. Patented June 6, 1882.
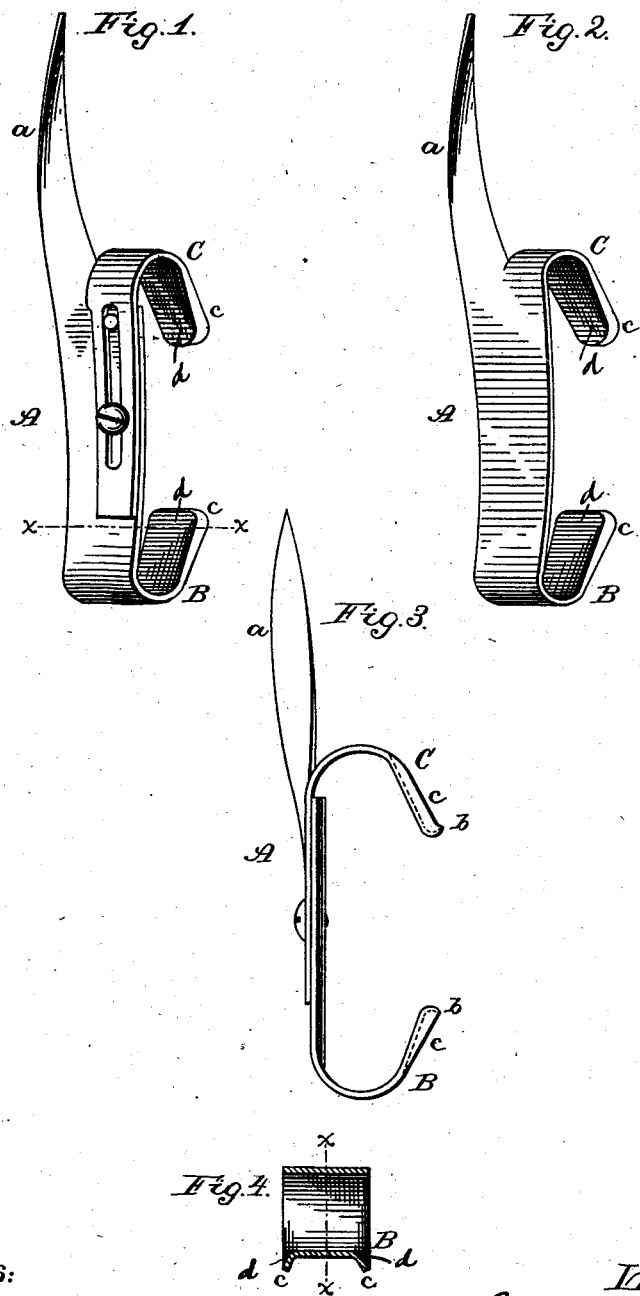
Witnesses:
J. W. Garner
E. Scott McCleary
Inventor:
Jacob Nixon
By F. O. McCleary,
His Attorney

UNITED STATES PATENT OFFICE.

JACOB NIXON, OF WINFIELD, KANSAS.

CORN-HUSKER.

SPECIFICATION forming part of Letters Patent No. 259,197, dated June 6, 1882.

Application filed April 21, 1882. (No model.)

*To all whom it may concern:*

Be it known that I, JACOB NIXON, of Winfield, in the county of Cowley and State of Kansas, have invented certain new and useful Improvements in Corn-Huskers; and I do hereby declare the following to be a full, clear, and exact description of the invention, such as will enable others skilled in the art to which it pertains to make and use the same.

My invention relates to corn-husking implements, the object being to provide a device of this character which will be convenient in use, and of such construction that the husking-pin may be so held as to cut the husk parallel with the grain of the latter without chafing the fingers of the hand, and without fear of injuring the fingers upon the ends of the retaining hooks or clasps.

The invention consists in the improved construction of husking implement hereinafter fully described, and pointed out in the claim.

Figure 1 is a perspective view of a corn-husking implement constructed in accordance with my invention. Fig. 2 is a similar view of a different form of husker. Fig. 3 is a side or edge view of the implement shown in Fig. 1. Fig. 4 is a transverse section on the line $xx$ of Fig. 1.

A represents the husking-pin, bent spirally to present a cutting-edge, $a$, in line with the grain of the husk when the implement is in use.

B represents a hook, formed integral with the pin A, and adapted to pass under and clasp the little finger of the hand.

C represents a similar hook, made adjustable, as shown in my Patent No. 254,682, dated March 7, 1882, or it may be formed integral with the pin A and bent in an opposite direction to the hook B, as shown in Fig. 2, to adapt it to pass over and clasp the second finger of the hand. The ends $b\,b$ of the hooks B and C are bent outwardly to avoid all possibility of their contact with the back of the fingers when in use. To further guard against any injury of the fingers, I provide the ends and the side edges of the hooks B and C with outwardly-turned flanges $c\,c$. The importance of thus constructing the husker will be apparent from the following explanation:

In the use of my improved husking implement provided with the spirally-twisted pin it is necessary to keep the cutting-edge $a$ of the latter in a position parallel with the grain of the husk; and in order to do this the husker must be manipulated by the fingers and pressed in to bear against the hand. By providing the smooth bearing-surfaces $d\,d$ for the fingers the device may be easily held without any liability of chafing or pricking the fingers; also, in the use of the spiral pin it is essential that the retaining-hooks should have a broad smooth inner bearing for the fingers, so that the hook will fit the fingers. This is not of so much importance where the shank of the implement is grasped by all of the fingers, the clasping-hooks acting merely as a secondary means of holding the implement.

In my device the hooks should be so formed as to fit upon the second and fourth fingers, the forefinger being left free to grasp and manipulate the ear of corn. Thus it will be seen that the device is held mainly by the hooks B and C, the grasping of the shank not being usually required.

I am aware that the combination, with a spirally-twisted husking-pin, of retaining-hooks is not broadly new, as such a device is covered by my Patent No. 254,682, granted March 7, 1882. I therefore make no claim in the present application to such a construction broadly; but, Having fully described my invention, what I claim as new, and desire to secure by Letters Patent, is—

A corn-husking implement consisting of a spiral pin, A, and the hooks B C, having flat inner surfaces, $d\,d$, flanges $c\,c$, and outwardly-bent ends $b\,b$, substantially as set forth.

In testimony whereof I have signed this specification in the presence of two subscribing witnesses.

JACOB NIXON.

Witnesses:
S. D. PRYOR,
H. E. SILLIMAN.